US011620919B2

(12) United States Patent
Boldenow et al.

(10) Patent No.: US 11,620,919 B2
(45) Date of Patent: Apr. 4, 2023

(54) LIVE VIRTUAL CONSTRUCTIVE GATEWAY SYSTEMS AND METHODS

(71) Applicant: SIERRA NEVADA CORPORATION, Sparks, NV (US)

(72) Inventors: Brandon Boldenow, Commerce City, CO (US); Peter Fischer, Highlands Ranch, CO (US); Nathan Gang, Centennial, CO (US); Maxwell O. Greenstein, Littleton, CO (US); Sarah Kooiman, Aurora, CO (US); Daniel Payne, Lakewood, CO (US); Christopher Poupore, Highlands Ranch, CO (US); Kyle P. Werner, Englewood, CO (US)

(73) Assignee: SIERRA NEVADA CORPORATION, Sparks, NV (US)

( * ) Notice: Subject to any disclaimer, the term of this patent is extended or adjusted under 35 U.S.C. 154(b) by 460 days.

(21) Appl. No.: 16/786,075

(22) Filed: Feb. 10, 2020

(65) Prior Publication Data

US 2020/0258414 A1 Aug. 13, 2020

Related U.S. Application Data

(60) Provisional application No. 62/804,079, filed on Feb. 11, 2019.

(51) Int. Cl.
*G09B 9/00* (2006.01)
*G06T 11/60* (2006.01)
*G09B 9/54* (2006.01)
*H04L 67/131* (2022.01)

(52) U.S. Cl.
CPC .............. *G09B 9/003* (2013.01); *G06T 11/60* (2013.01); *G09B 9/006* (2013.01); *G09B 9/54* (2013.01); *H04L 67/131* (2022.05)

(58) Field of Classification Search
CPC .......... G09B 9/00; G09B 9/003; G09B 9/006; G09B 9/54; G06T 11/60; H04L 67/131
See application file for complete search history.

(56) References Cited

U.S. PATENT DOCUMENTS

| 6,053,736 A * | 4/2000 | Huffman ................. F41G 7/006 434/21 |
| 7,085,694 B2 | 8/2006 | Xavier et al. |
| 8,641,420 B2 | 2/2014 | Poole et al. |
| 8,878,846 B1 | 11/2014 | Francis, Jr. et al. |

(Continued)

FOREIGN PATENT DOCUMENTS

WO   WO2013184155   12/2013

*Primary Examiner* — Timothy A Musselman
(74) *Attorney, Agent, or Firm* — KOS IP Law LLP

(57) ABSTRACT

A live virtual constructive (LVC) gateway system is configured to transparently separate, merge, and route data traffic between operator systems, live tactical Line Replaceable Unit (LRU) systems, and simulated tactical LRU systems. The LVC gateway is configured to receive LRU commands from an operator system, parse, the commands, and reconstruct the commands suitable for transmission to live or simulated tactical LRU systems. The LVC gateway is also configured to receive live and simulated status and target data from live tactical LRU and simulated tactical LRU systems, respectively, and merge the data for transmission to an operator system.

44 Claims, 7 Drawing Sheets

(56) References Cited

U.S. PATENT DOCUMENTS

| | | |
|---|---|---|
| 9,099,009 B2 | 8/2015 | Sowadski et al. |
| 9,230,446 B1 * | 1/2016 | Mendro ................... G09B 9/44 |
| 9,836,989 B2 | 12/2017 | Wenger et al. |
| 2003/0215771 A1 | 11/2003 | Bartoldus et al. |
| 2007/0239418 A1 | 10/2007 | Harrison et al. |
| 2013/0323686 A1 | 12/2013 | Wenger et al. |
| 2014/0205203 A1 | 7/2014 | Lackey et al. |
| 2017/0069218 A1 | 3/2017 | Shin et al. |
| 2017/0294135 A1 * | 10/2017 | Lechner ................ G06T 19/006 |

\* cited by examiner

LIVE VIRTUAL CONSTRUCTIVE GATEWAY SYSTEMS AND METHODS

CROSS-REFERENCE TO RELATED APPLICATIONS

This Application claims priority to U.S. Patent Provisional Application No. 62/804,079, filed Feb. 11, 2019, the entire disclosure of which is expressly incorporated herein by reference.

FEDERALLY SPONSORED RESEARCH OR DEVELOPMENT

Not Applicable

BACKGROUND

The present disclosure relates to augmented training simulation systems.

System Operators of tactical systems frequently need to communicate with Line Replaceable Units (LRUs) of discrete devices, such as aircraft or weapon systems. For example, in a live environment 100A as shown in FIG. 1A, an operator system 120 communicates with a live tactical LRU 110 via an electronic communication medium. The operator system 120 transmits OS→LRU command data 122 to a live tactical LRU 110, and receives live status and target data 112 in response. However, training on real-world devices can be prohibitively expensive, for example when the LRU is an aircraft system.

Simulated systems have been developed, such as those disclosed in U.S. Pat. No. 9,099,009 to Sowadski and U.S. Pat. No. 9,836,989 to Wegner, to reduce the costs of training individuals on real-world systems. For example, in a training environment 100B as shown in FIG. 1B, an operator system 120 communicates with a simulated tactical LRU 130 via an electronic communication medium. The operator system 120 transmits OS→LRU command data 122 to a simulated tactical LRU 130, and receives simulated status and target data 132 in response. Simulated data, however, may vary with respect to the modeled level of fidelity, and therefore may not be a perfect replication of live data. In other words, simulated data has some inherent inaccuracies with respect to live data. Furthermore, some simulated data may be predictable as it is frequently generated as a function of an algorithm. Due to these factors, simulated data provides less valuable experience for system operator trainees than when the trainees train with live tactical LRUs.

In addition, some simulation systems comprise custom-built and proprietary training environments for each situation—for example a specific aircraft cockpit or a specific weapon system interface. However, such systems are unable to be used in other environments, and may be prone to malfunction if any hardware or software is altered. In addition, some complex simulated subsystems cannot be simulated with great accurately, preventing trainees from experiencing how those complex subsystems may impact real-world scenarios.

It would therefore be desirable to provide improved simulation systems to address these issues.

SUMMARY

A live virtual constructive (LVC) gateway system is disclosed, which is used to blend both real world and simulated training exercises. Such systems could be used to provide advanced training of scenarios that could not otherwise be performed safely, using fewer resources than live training in the field, while still providing the inherent randomness and feedback of real-world live training exercises.

A preferred system comprises at least a live tactical LRU transceiver for transmitting and receiving live tactical LRU data with at least one live tactical LRU device, a simulated tactical LRU transceiver for transmitting and receiving data with at least one simulated tactical LRU device, and an operator transceiver for transmitting and receiving data with at least one operator device. Live tactical LRU devices are preferably real world, physical systems, that are used to perform an intended operation or task being trained. Simulated tactical LRU devices are preferably software programs that model one or more live tactical LRU devices and that output data in the same format using the same protocols as the original live tactical LRU device. An LVC gateway functionally coupled to the transceivers has computer software that, when executed by a computer processor, executes instructions to parse, merge, and reconstruct data suitable for transmission to the various devices via the transceivers.

For example, in some embodiments, the LVC gateway could be configured to merge live tactical LRU data and simulated tactical LRU data in accordance with at least one merging ruleset to generate merged LRU data and transmit at least a portion of the merged LRU data to the operator device as transmitted operator data. For example, the LVC gateway could be configured to overlay a set of simulated radar tracks received from a simulated tactical LRU device over a set of live radar tracks received from a live tactical LRU device to generate a merged radar track comprising both simulated and live radar tracks. In another example, the LVC gateway could be configured to integrate a simulated audio stream received from a simulated tactical LRU device with a live audio stream received from a live tactical LRU device to generate a merged audio stream. In yet another example, the LVC gateway could be configured to blend augmented reality data received from a simulated tactical LRU device with a live video stream received from a live tactical LRU device to generate a merged video stream. Similarly, the LVC gateway could be configured to blend one or more 3-D models received from a simulated tactical LRU device with a live video stream to generate a simulated video target stream. In such embodiments, the live video stream could comprise data received from an electro-optical infra-red (EO-IR) turret video output transceiver. In another embodiment, a simulated target from a simulated tactical LRU could be blended with data received from a wide-area motion imagery (WAMI) device to generate a training data set comprising one or more simulated targets. In some embodiments, at least some of the live and simulated tactical LRU data are not used when merging the data to create merged data to transmit to at least one operator system.

In some embodiments, the data received from a live tactical LRU device and a simulated tactical LRU device are not compatible with one another. For example, each may use different radio frequency space (RF-space) formats. In such embodiments, the LVC gateway may be configured to automatically translate received data before merging the data in order to optimize the merge process. For example, the LVC gateway could be configured to analyze a live tactical LRU data stream to determine an RF-space format used by a live tactical LRU device, and could then automatically convert the simulated tactical LRU data to the determined RF-space format to generate translated simulated tactical LRU data from the received simulated tactical LRU data. The translated simulated tactical LRU data could then be more easily merged with the live tactical LRU data received from a live tactical LRU device.

In other embodiments, the LVC gateway could be configured to filter commands from operator data received from at least one operator system to generate both live tactical LRU commands and simulated tactical LRU commands in accordance with at least a filtering ruleset, transmit at least a portion of the live tactical LRU commands to at least one live tactical LRU device, and transmit at least a portion of the simulated tactical LRU commands to at least one simulated tactical LRU device. In some embodiments, at least some of the live tactical LRU commands and simulated tactical LRU commands are reconstructed using simulated or historical data in order to more accurately mimic an operator system configured to solely communicate with a live tactical LRU or a simulated tactical LRU, respectively.

DETAILED DESCRIPTION

Figure 1A:
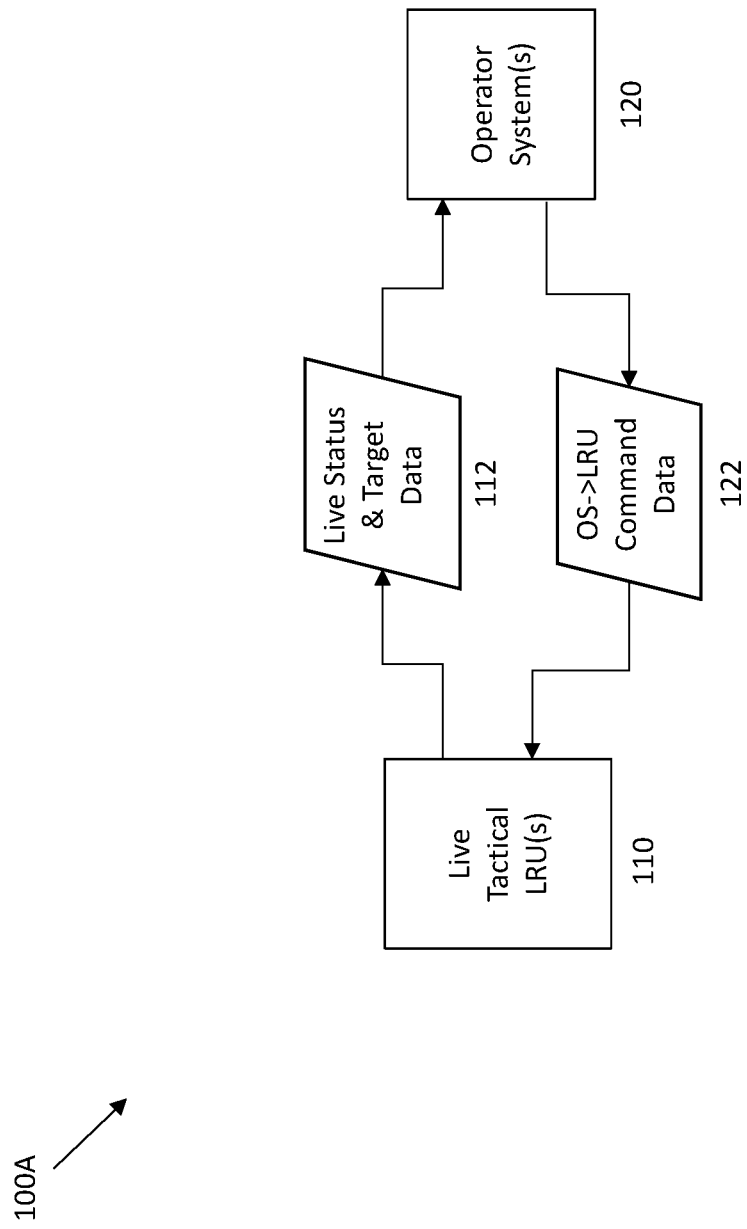
FIG. 1A shows a schematic diagram of a prior art live tactical system functionally controlled by an operator system.

The following detailed description describes embodiments of LVC gateway systems and methods that could be used to receive, modify, route, reconstruct, and transmit data sent to an LVC gateway in accordance with aspects of the inventive subject matter.

As used herein, an "LVC Gateway" comprises any suitable computer system configured to transmit and receive data with at least one live tactical LRU system, at least one simulated tactical LRU system, and at least one operator system. An LVC gateway is configured to create a high fidelity, augmented reality experience for an operator training scenario, generally by creating merged LRU data that can comprise a combination of both live tactical LRU data and simulated tactical LRU data for an operator system. It should be appreciated that each set could comprise anywhere from a single device to a plurality of devices. For example, a single live tactical LRU, such as a live radar device, could generate data that is collected by an LVC Gateway and is sent to a plurality of operator systems and/or a plurality of simulated tactical LRUs. In another embodiment, a single simulated tactical LRU could generate a single set of data that is received by an LVC gateway and is promulgated to a plurality of operator systems and/or a plurality of live tactical LRUs. In a similar manner, the LVC gateway is shown here as a single device, but it could comprise a distributed computer system or even a cloud-based computer system spread over an intranet or the Internet. Preferably, the LVC gateway, even while distributed among a plurality of computer systems, acts cooperatively with the distributed systems to effectively function as a single device, for example by having a single IP address to a computer system that distributes the workload among a plurality of computing devices. The devices are shown here as functionally coupled with one another in such a manner as to send electronic communications to one another, which could be via any suitable wired or wireless network connection that allows data to be transmitted from one electronic device to another.

As used herein, a "computer system" comprises any suitable combination of computer or computer devices, such as desktops, laptops, cellular phones, blades, servers, interfaces, systems, databases, agents, peers, engines, modules, or controllers, operating individually or collectively. Computer systems and servers may comprise at least a processor configured to execute software instructions stored on a tangible, non-transitory computer readable storage medium (e.g., hard drive, solid state drive, RAM, flash, ROM, etc.). The software instructions preferably configure the computer system and server to execute the functionality as disclosed.

As used herein, the term "functionally connected" or "functionally coupled" comprises network infrastructure that allows two electronic devices to transmit data in at least one direction between the devices. Such connections could be wired or wireless, and they could have any number of intermediary devices passing along the data.

As used herein, an "LRU" comprises a line replaceable unit device, for example an interface for a radar, a camera, a sensor, a radio, a weapons system, a GPS (global positioning system), an INS (inertial navigation system), an EW (electronic warfare) system, a SIGINT (signals intelligence) system, a COMINT (communications intelligence) system, an ELINT (electronic intelligence) system, an IMINT (imagery intelligence) system, an EO-IR (electro-optical infrared) system, an FMV (full motion video) system, a WAMI (wide-area motion imagery intelligence) system, a flight control system, an avionics system, a targeting system, an industrial control system, and an automation system. A live tactical LRU device comprises a device that generates and transmits live, streaming data recorded from active sensor devices in the field, while a simulated tactical LRU device comprises a device that generates and transmits simulated, streaming data generated by simulation software, such as those developed by U.S. Pat. No. 9,099,009 to Sowadski or U.S. Pat. No. 9,836,989 to Wegner, which are both incorporated by reference herein. Such simulated tactical LRU devices can be executed on any suitable computer system, for example a stand-alone device networked to the LVC Gateway, or virtually in a cloud computing environment. In some embodiments, a simulated tactical LRU device could comprise a device that is coupled to a live tactical LRU, for example via a network or via an LVC gateway, that is configured to receive live tactical LRU data and record that data. Such a simulated tactical LRU device comprising historical live tactical LRU data could be configured to transmit pre-recorded captured data from a live tactical LRU device upon receipt of an appropriate command. For example, a simulated tactical LRU device could capture historical radar data and re-transmit it later for a tactical simulation.

As used herein, an "operator system" comprises a computer system for an operator user executing operator software for a live virtual constructive training or exercise. Such systems could comprise any suitable combination of hardware and software for an operator to train within, such as a flight simulator cockpit for a fighter pilot trainee operator, or a VR (virtual reality) headset and virtual weapon for a ground unit trainee operator. An operator system could comprise a plurality of hardware units that cooperatively or individually transmit and receive data with one or more LRU devices, or an LVC gateway, such as an LVC gateway 140 shown in FIG. 1C, that is configured to mimic one or more LRU devices.

As used herein, an "admin system" comprises a computer system or a terminal for an administrator user executing administrator software, for example software executing on an LVC gateway or client admin software on a remote computer system interfacing with settings software on an LVC gateway, which can be used to set up one or more settings for an LVC gateway. An admin system could be used by an admin user to set up an LVC gateway and configure the LVC gateway to mimic appropriate devices for an LVC system. For example, an admin system could set up an LVC gateway to have a first series of IP addresses that each acts as a separate LRU to communicate with one or more operator systems, a second series of IP addresses that each acts as a separate operator system to communicate with one or more live tactical LRUs, and a third series of IP addresses that each acts as a separate operator system to communicate with one or more simulated tactical LRUs. An admin system could also be used as an admin to select, generate, or modify rulesets, such as merging rulesets or filtering rulesets, that are used to alter, route, and modify data that is sent to an LVC gateway.

Figure 1B:
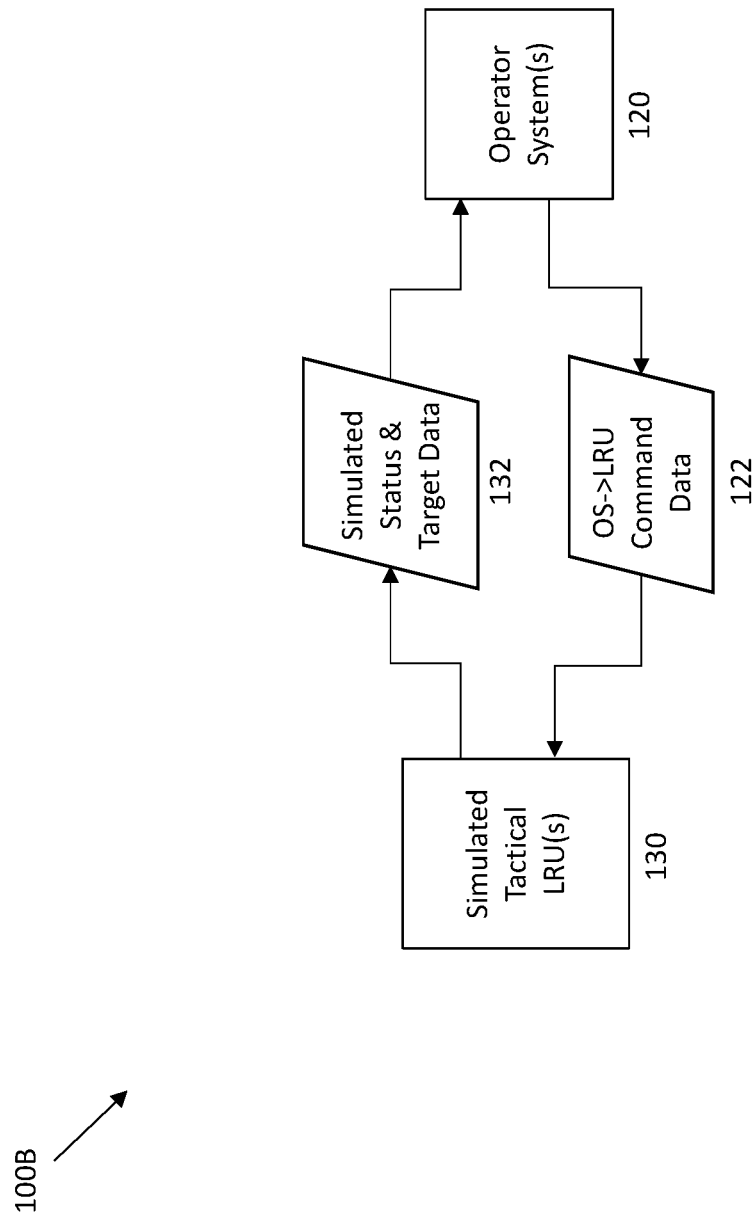
FIG. 1B shows a schematic diagram of a prior art simulated training environment system functionally controlled by an operator system.
Figure 1C:
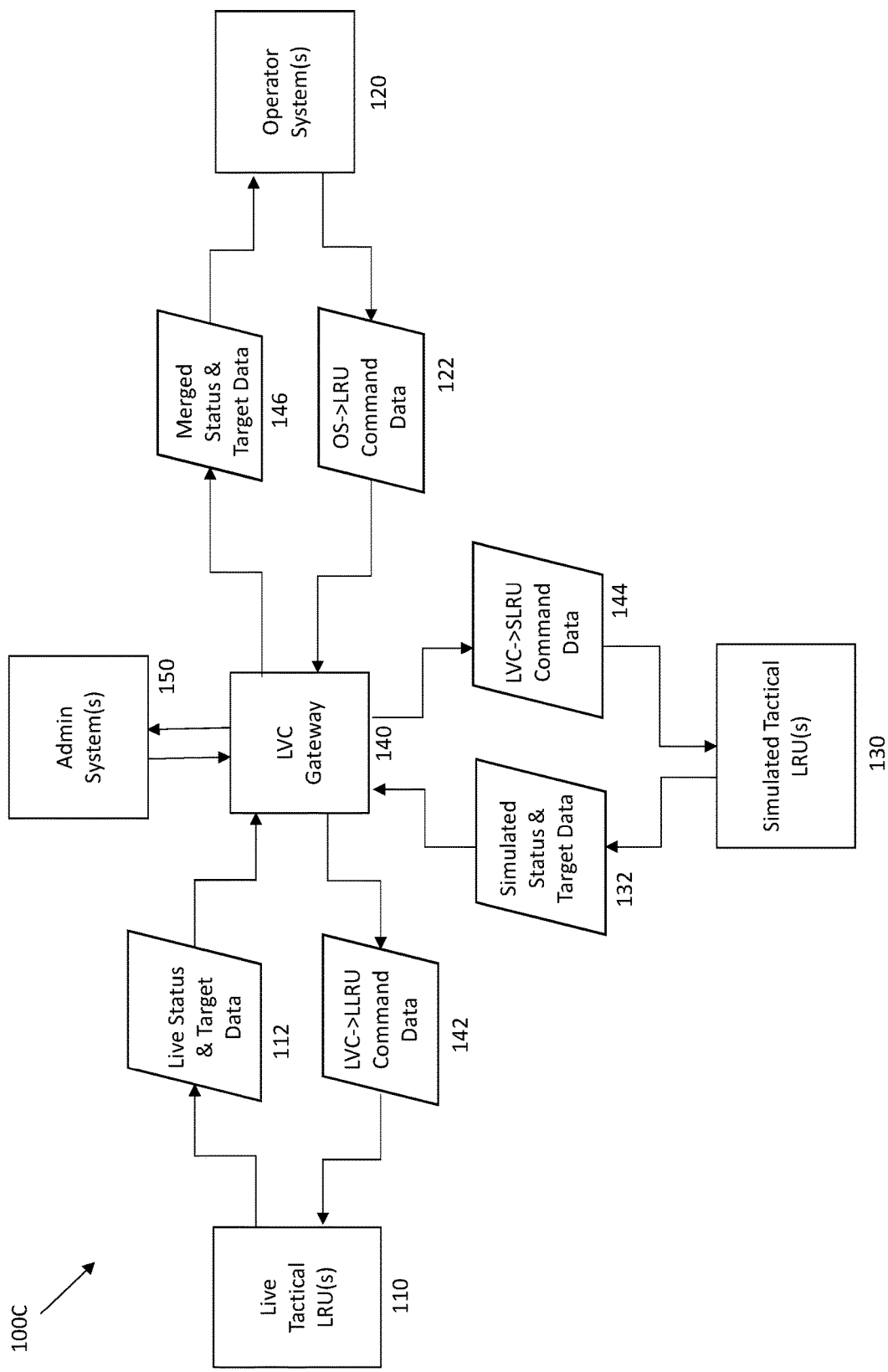
FIG. 1C is a schematic diagram of an LVC (Live Virtual Constructive) gateway system in accordance with this disclosure, functionally coupled to a set of live tactical LRUs, a set of simulated tactical LRUs, a set of operator systems, and a set of admin systems.

FIG. 1C diagrammatically illustrates an exemplary Live Virtual Constructive (LVC) Gateway System 100C having an LVC Gateway 140 that transparently handles traffic between one or more operator systems 120, one or more live tactical LRUs 110, and one or more simulated tactical LRUs 130. In some embodiments, the LVC Gateway does not require any configuration to be performed on any of the live tactical LRU 110, operator system 120, or simulated tactical LRU 130 beyond what is normally necessary to set up such systems that lack an LVC Gateway, such as the systems of FIG. 1A and FIG. 1B. In other words, the operator system 120 preferably communicates with the LVC gateway 140 as if the LVC gateway 140 was a live tactical LRU; the live tactical LRU 110 preferably communicates with the LVC gateway 140 as if the LVC gateway 140 was an operator system, and the simulated tactical LRU 130 communicates with the LVC gateway 140 as if the LVC gateway 140 was an operator system. An administrator user could use one or more admin systems 150 to configure the LVC gateway to receive, parse, and reconstruct data traffic for appropriate transmission to such devices.

The LVC gateway 140 could comprise any suitable computer system configured to electronically transmit and receive data with an operator system 120, live tactical LRU 110, and a simulated tactical LRU 130. Preferably, the operator system 120 is LRU device agnostic, and is not configured to communicate only with live tactical LRU devices or only with simulated tactical LRU devices. For example, the operator system 120 could be configured to transmit command data to, and receive status and target data from, a radar system, which could be a live tactical LRU radar system or a simulated tactical LRU radar system. In some embodiments, in addition to the LVC gateway 140, an operator system 120 could be configured to directly communicate with other live tactical LRU(s) and simulated tactical LRU(s). Such LRUs are not shown here in FIG. 1C as they would not be a part of the LVC gateway system 100C, and would simply be additional LRU systems that are functionally coupled to the operator system 120.

In some embodiments, the operator system 120 is configured to communicate with live tactical LRU devices, and both the LVC gateway 140 and the simulated tactical LRU 130 are configured to simulate live tactical LRU devices. Generally, the operator system 120 is configured to transmit commands to an LRU device and receive status and target data from an LRU device. In the LVC gateway system 100C, the LVC gateway 140 is configured to receive OS→LRU command data 122 from the operator system 120, and to transmit merged status and target data 146 to the operator system 120. For example, the operator system 120 could transmit a command to the LVC Gateway 140 for a GPS device to retrieve location data by transmitting OS→LRU command data 122 to an IP address that is bound to the LVC gateway 140, and the LVC gateway 140 could then be configured to return latitude and longitude data. In another example, the operator system 120 could transmit a command to the LVC gateway 140 for a radar device to receive radar data, and the LVC gateway 140 could then, in response, return locations and attributes of object pings in a radar data format. Such returned data could comprise data that are routed from a live tactical LRU 110 to the operator system 120, routed from a simulated tactical LRU 130 to the operator system 120, or collected from both a live tactical LRU 110 and a simulated tactical LRU 130 and merged into a new dataset before being transmitted to the operator system 120.

The LVC Gateway 140 could also return latitude and longitude data, or the operator system 120 could transmit a command to the LVC Gateway 140 for a radar device to retrieve radar data, and the LVC Gateway 140 could return locations and attributes of object pings in a radar data format. Exemplary commands include commands for an LRU, such as the live tactical LRU 110 or the simulated tactical LRU 130, to perform a task, for example turning on/off, changing power, steering left/right, initializing, firing (for weapons), and locking on target for tracking systems. The LVC gateway 140 handles routing, trafficking, filtering, dividing, translating, formatting, and merging of command data and status/target data between the operator system 120, the live tactical LRU 110, and the simulated tactical LRU 130, such that each live tactical LRU 110 transmits/receives data normally as if it is communicating directly with an operator system, and each operator system 120 transmits/receives data normally as if it is communicating directly with a live tactical LRU. In other words, no additional software/hardware configurations need to be performed or provided on either the operator system 120 or the live tactical LRU 110 when converting an operator system 120 from one that uses only live tactical LRUs, such as the live environment 100A, or when converting an operator system 120 from one that uses only simulated tactical LRUs, such as training environment 100B, to one that uses both live tactical LRUs and simulated tactical LRUs via the LVC Gateway, such as the LVC gateway system 100C.

In some embodiments, a single simulated tactical LRU device could generate and transmit simulated status and target data for a plurality of operator systems, such that a single trainer manages a plurality of trainee operator environments. Exemplary status data may include system diagnostics or configuration; for example the direction a camera is aimed or the fidelity of an image for a camera LRU, a number of hits for a radar LRU, a location for a GPS LRU, or air pressure and heading for an avionics LRU. In such embodiments, the simulated tactical LRU device could not only transmit simulated status and target data to the LVC gateway, but it could also transmit rulesets and commands to the LVC gateway to dynamically administer and/or manage an environment of one or more operator systems functionally coupled to the LVC gateway. In other embodiments, a separate administrative ("admin") user employs a user interface (not shown) functionally coupled to the LVC gateway to appropriately route data to and from a designated operator system. A simulated tactical LRU is preferably a computer-based simulator that can run on a stand-alone computer, or a virtualized computer, which emulates at least one functional output of a live tactical LRU, and preferably simulates the functional output as a function of an input.

The LVC Gateway system of the present disclosure preferably provides a flexible and scalable rule-based LVC solution that allows one or more admin users to control the interaction of simulated tactical LRU devices and live tactical LRU devices dynamically using a rule-based data management and routing engine in the LVC Gateway. Preferably, the LVC Gateway tracks the ICD (interface control document) for data sent/received between the LVC Gateway and the live tactical LRU(s) and the operator system(s). With the LVC Gateway, an admin user can map the source for specific functions or data fields for each subsystem, either real LRU devices or simulated tactical LRU devices, and then route messages from the operator to the appropriate LRU device. Responses from real LRU devices and simulated tactical LRU devices are preferably aggregated by the LVC Gateway based on ruleset definitions, and then are combined into coherent responses to an operator system.

As shown, the LVC gateway preferably uses a rule-based processing engine to determine how to merge live and simulated status and target data from a given LRU before forwarding that data to an operator system. The LVC gateway preferably also uses a rule-based processing engine to determine which command data and/or messages are forwarded to either a live and/or simulated tactical LRU.

Preferably, the LVC gateway system automatically detects and categorizes status and target data and command data as a function of data received from the live tactical LRU and the operator systems, and the LVC gateway system automatically normalizes such data for use with the simulated tactical LRU as needed. This allows the LVC gateway to be both flexible and scalable for large-scale environments with disparate hardware/software requirements. Admin users can preferably specify exactly how interactions between the simulated data and the live data occur using the disclosed high-performance, low-latency, and dynamic message processing and routing modules. The disclosed embodiments process all data and preferably run them through state-based rulesets that include how to process the data, and what source it should come from based on user designated training requirements. For example, an admin user may wish to train a trainee on how to use a SIGINT or radar system, but actual representative targets are not available via the live tactical LRU devices. The present system could have a ruleset under which all configurations occur with the live tactical LRU(s), but all targets and tracks are generated by the simulated tactical LRU(s)—allowing the trainee to perform complex and high fidelity training while operating with physical hardware located within a lab environment.

Exemplary LVC gateways can leverage system interoperability and rule-based processing for cyber security with a unique solution to enable the combination of simulated and live environments. The resulting rule-based processing modules could manage and map data with a dynamic message engine to aggregate multiple sources seamlessly. This solution can support existing simulations and live hardware with no change, as it enables the communication between the disparate systems' communication standards. The rule-based engine allows the system configurator to set logic that determines what simulated data is entered into and impacts the live environment and the simulated environment. For example, in a radar simulation, with an LVC gateway in accordance with this disclosure, all the configurations of the radar will be with a live radar; however, the tracks and data displayed will be based on simulated data. The system configurator selects which portions of the training or testing should be live or simulated from each source, and these portions are combined in a single output that blends the live and simulated data. This allows complex and high-fidelity training in environments that would otherwise be impractical or impossible, such as training procedures and methods or hardware configurations that are location specific.

Figure 2:
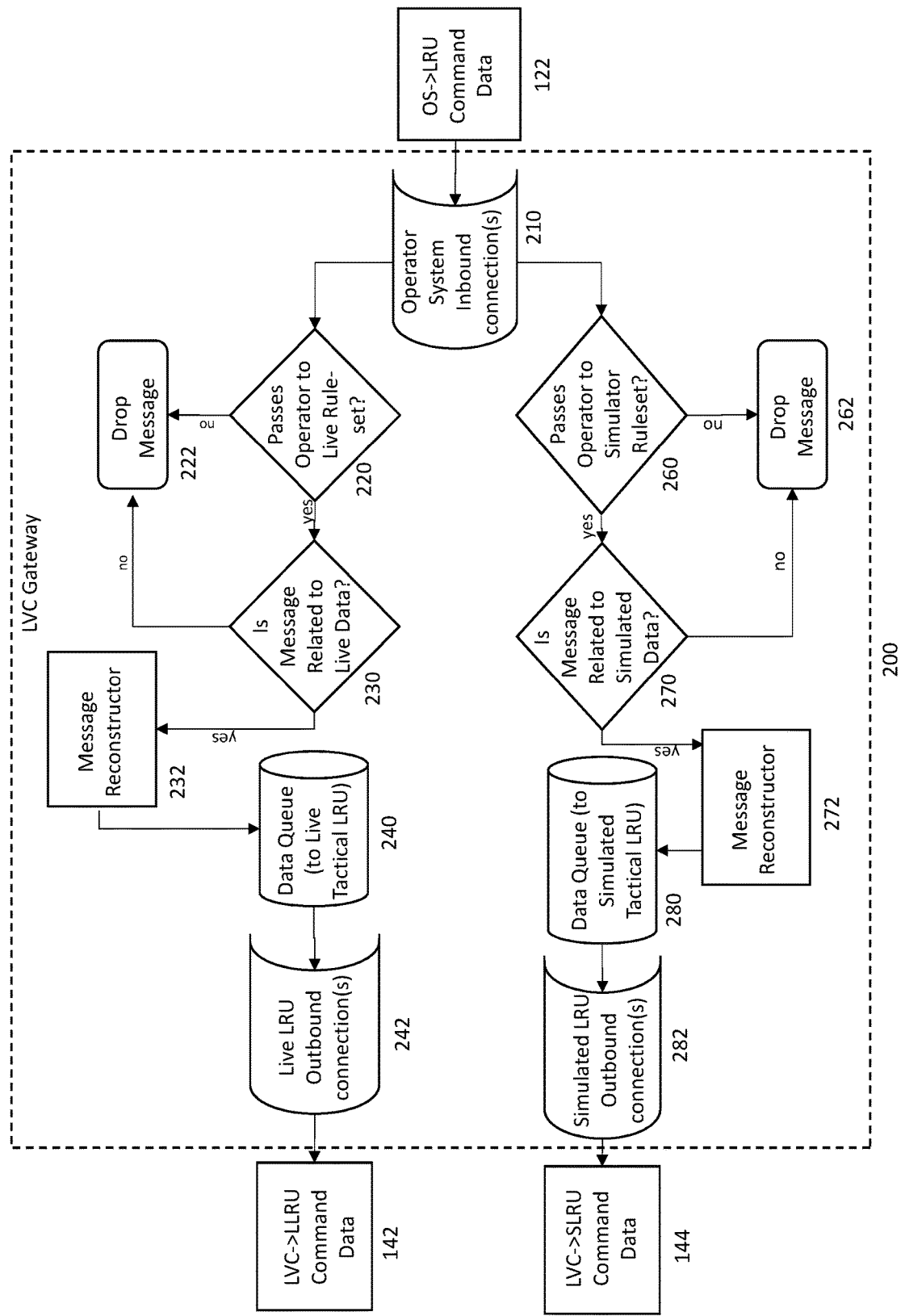
FIG. 2 is a schematic diagram of a logic tree for incoming messages from an Operator System to the LVC Gateway, in accordance with aspects of this disclosure.

FIG. 2 diagrammatically represents exemplary LVC gateway logic for an LVC gateway 200 that receives OS→LRU command data 122 that is sent from an operator system to the LVC gateway 200 for routing to at least one of a set of live tactical LRUs and a set of simulated tactical LRUs. While FIG. 2 shows a single operator system inbound connection 210 that receives OS→LRU command data 122 from one or more operator systems, a single live LRU outbound connection 242 that transmits LVC→LLRU (live virtual constructive to live tactical line replaceable unit) command data to one or more live tactical LRUs, and a single simulated LRU outbound connection 282 that transmits LVC→SLRU (live virtual constructive to simulated tactical line replaceable unit) command data to one or more simulated tactical LRU devices, an LVC gateway could have any number of physical and virtual inbound and outbound transceiver connections to route data to and from the LVC gateway depending on the needs of the operator system. An OS→LRU command sent to an operator system inbound connection 210 may comprise a command to an LRU device, such as a command to transmit data from a sensor to the operator system or a command to transmit a current status state from an LRU to the operator system. However, in some embodiments, the message could be an audio and/or video stream, such as a command to a radio LRU or to an EO-IR LRU.

In the present embodiment, any received OS→LRU command data 122 received by the inbound connection 210 is sent to a first command qualification module 220 that determines whether that command satisfies a live data ruleset, and to a second command qualification module 260 that determines whether that command satisfies a simulated ruleset. Such rulesets could be selected, defined, or modified by an administrator user of the LVC gateway 200. Exemplary rulesets include, for example, a live ruleset that transmits all radar commands to live tactical LRUs and a simulator ruleset that blocks all radar commands to simulated tactical LRUs, or a live ruleset that transmits all INS commands having an urgent flag set to a live tactical LRU, blocks all INS commands not having an urgent flag set from being sent to a live tactical LRU, blocks all INS commands having an urgent flag set from being sent to a simulated tactical LRU, and allows all INS commands not having an urgent flag set to be sent to simulated tactical LRUs. While the present embodiment contemplates separate live rulesets and simulator rulesets, some embodiments may have single rulesets that contain rules for both live and simulated tactical LRU devices. Rulesets are defined by admin users to determine how commands are routed. For example, in some embodiments an admin user may wish for COMINT commands to be only routed to live tactical LRUs, but may wish for radar commands to be routed to both live and simulated tactical LRUs. Messages that do not satisfy live ruleset preconditions can be dropped by a first message-dropping module 222, while messages that do not satisfy simulated ruleset preconditions can be dropped by a second message-dropping module 262.

Command data could then be forwarded to a third command qualification module 230 to determine whether the command is related to live data, or to a fourth command qualification module 270 to determine whether the command is related to simulated data. The third command qualification module 230 could, for example, analyze the command to determine what kind of command has been sent, and could then query a table to determine which connected live tactical LRU devices are able to handle the command that is sent, and then route the command to an appropriate queue. Likewise, the fourth command qualifications module 270 could analyze the command to determine what kind of command has been sent, and could then query a table to determine which connected simulated tactical LRU devices are able to handle the command that is sent, and then route the command to an appropriate queue.

The command is preferably provided to a data queue for the appropriate tactical LRU, such as a first data queue 240 for a live tactical LRU or to a second data queue 280 for a simulated tactical LRU. The data queues 240, 280 could be simple FIFO queues, parallel queues, or priority queues, for example. The selected data queue 240, 280 would then transmit the command to its associated tactical LRU (live LRU 142 or simulated LRU 144) via a live LRU outbound connection transmitter 242 or a simulated LRU outbound connection transmitter 282, as appropriate. In some embodiments, a ruleset will process the command before transmission in accordance with a ruleset, for example by normalizing the command, by duplicating the command to be sent to a plurality of LRUs, or by filtering out a part of the command instead of receiving a command and then dropping it.

In this manner, command data could be sent from an operator system to the live tactical LRU along another data path (not shown), which could include location (latitude, longitude, altitude), speed, etc., such that the operator system appears as if it is airborne or moving even if it is stationary. The LVC gateway preferably maintains overall scenario states and passes that information between the simulated and live tactical LRU systems, such that both sets of systems are synchronized with one another. In some embodiments, a single command could be sent to both a live tactical LRU and a simulated tactical LRU. For example, in an embodiment where a live tactical LRU radar is supplying some radar data to the operator system, and a simulated tactical LRU radar is supplying other radar data to the operator system, a command, "turn off radar" could be sent to both systems to prevent both LRU radar devices from transmitting radar data to the operator system. In other embodiments, the command may only be sent to the simulated tactical LRU, for example where a radio communication is simulated, the command, "change frequency of radio" could be sent only to a simulated tactical LRU.

Message reconstructors, such as message reconstructors 232, 272, and 322, could be used to reconstruct and/or translate a command that is to be sent to an LRU (e.g. to a data queue to a live tactical LRU or to a simulated tactical LRU). In some embodiments, the command need not be reconstructed at all. For example, when live GPS is running, the LVC gateway could act as a passthrough for the live or simulated GPS messages. In other embodiments, the command could be reconstructed using null data or zeroed-out data, for example where a quadrant of a radar is filtered out by the ruleset. In still other embodiments, the command is reconstructed using data stored on an internal database of the LVC gateway 200. For example, a command sent to an LRU of a first identifier could be reformatted to be sent to an LRU of a second identifier, where the second identifier is a live tactical LRU connected to the live LRU outbound connection 242. In other embodiments, a message reconstructor could be used to translate a command from one format to another. For example, a command could be sent to retrieve radar data, where a live tactical LRU radar uses a different protocol or RF-space than a simulated tactical LRU. The command could be sent from the operator system using a first protocol or RF-space, which is forwarded to the live tactical LRU as-is, but could then be translated to a second protocol or RF-space before it is forwarded to the simulated tactical LRU. In this manner, a single command could be transmitted to both a live and simulated LRU by properly configuring the message reconstructors 232 and 272.

Figure 3:
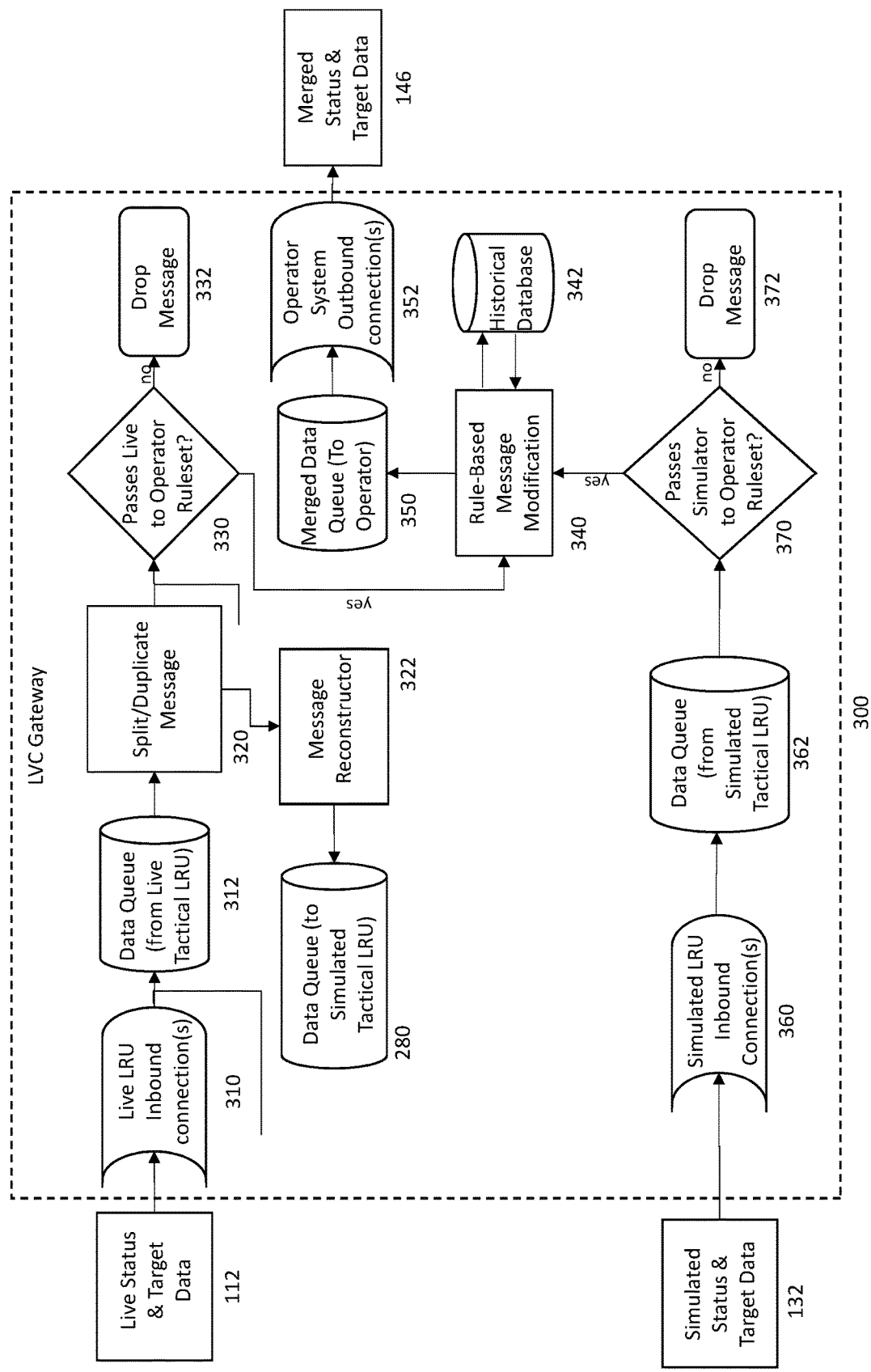
FIG. 3 is a schematic diagram of a logic tree for outgoing messages to an Operator System from the LVC Gateway, in accordance with aspects of this disclosure.

FIG. 3 diagrammatically represents exemplary LVC Gateway logic for an LVC gateway 300 to receive live status and target data 112 from a live tactical LRU and simulated status and target data 132 from a simulated tactical LRU. The received data are then filtered, translated, merged, and possibly reconstructed before being sent to an operator system as merged status and target data 146. Live status and target data 112 from a live tactical LRU are transmitted to a live inbound connection 310, while simulated status and target data 132 are transmitted to a simulated LRU inbound connection 360. In some embodiments, all data sent from a live tactical LRU is duplicated via split/duplicate message module 320 to be transmitted to both the simulated tactical LRU data queue 280 and to the rule-based message modification module 340. This is particularly useful for data that may have parts that need to be simulated for reconstruction.

In some embodiments, the "split/duplicate message" module 320 examines the data using a live operator ruleset module to determine what live data are filtered and/or passed on. If the data satisfy the rulesets of the live operator ruleset module, then the message from the live operator ruleset module are forwarded to a merged data queue 350 to the operator. If the data fail to satisfy the rulesets of the live operator ruleset module, the command is not sent to the merged data queue 350, and the "split/duplicate message" module 320 instead transmits the live tactical LRU data to the data queue for the simulated tactical LRU 280. In either embodiment, when the live tactical LRU data are transmitted to the simulated tactical LRU, the simulated tactical LRU could use the live tactical LRU data to generate simulated messages/status data/target data.

A rule-based message modification module 340 could review both received live status and target data and simulated status and target data and determine how data should be modified. If only one type of data is received (for example, only live radar data is received, or only simulated GPS data is received), then the rule-based message modification module 340 could add that data to the merged data queue module 350 to be sent via an operator system outbound connection 352. However, if both live and simulated status and target data are received, the rule-based message modification module 340 could be configured to merge the data to enter the merged data queue 350. An admin user could configure the LVC gateway 300 to merge any suitable data from both live and simulated LRC devices. For example, target imagery could be merged with live synthetic aperture radar (SAR) imagery, or live 3-D models could be merged with a live stream recording to provide target data. Additional examples of such merged data could be, for example, simulated target imagery merged with live synthetic aperture radar (SAR) imagery, simulated radar tracks merged with live radar tracks, simulated ISAR (inverse synthetic aperture radar) imagery merged with live ISAR imagery, simulated weather and/or turbulence data merged with live weather data, simulated audio streams merged with live audio streams, simulated J-Series messages merged with live J-Series messages, simulated VMF messages merged with live VMF messages, simulated K-Series messages merged with live K-Series messages, or simulated targets merged with video streams or static image data.

Any suitable algorithm could be used by the rule-based message modification module 340 to merge data from both the live tactical LRU and the simulated tactical LRU. For example, an exemplary interface control document (ICD) for a GPS device of the operator system is shown below:
GPS System ICD
Byte 0-version
Byte 1-bit field for alarms
Byte 2-Number of satellites
Byte 3-Latitude
Bute 4-Longitude
Byte 5-Altitude An exemplary ruleset used by the rule-based message modification module for such an ICD could be as follows:
Byte 0-live
Byte 1-sim
Byte 2-live
Byte 3-sim
Bute 4-sim
Byte 5-sim While the example above illustrates a ruleset between a single live tactical LRU and a single simulated tactical LRU, a plurality of live and/or simulated tactical LRUs could be used for any number of ICDs. Preferably, data merged from disparate live/simulated systems are merged at a message field or byte level, such that a response to the operator system is formed appropriately in accordance with an ICD. Multiple rulesets could also have common sources. For example, a ruleset for a GPS for two different operator systems could share the same live GPS tactical LRU devices but different simulated GPS tactical LRU devices, or they could have different live GPS tactical LRU devices but the same simulated GPS tactical LRU device. Rulesets could be provided in any suitable template, for example in a database legend or via an XLM document.

In other embodiments, the rule-based message modification module 340 could be configured to merge dummy data or historical data saved on a database of the LVC gateway with one or more of the data streams from the live tactical LRU and/or the simulated tactical LRU. For example, where J-Series messages were captured from a previous live or simulated exercise, these messages could be played back at a later time to replay the exercise without needing the involvement of all participants. Such streams could be saved by an admin user of the LVC gateway 300 during a previous simulation, and then could be configured to be replayed in accordance with a configuration defined by the admin user after the recording has been saved in historical database 342.

In some embodiments, all live data are forwarded over an auxiliary connection to the simulated tactical LRU via data queue 280, also shown in FIG. 2. For example, a simulator that receives live status and target data could match simulated RF (radio-frequency) settings to match the received live RF settings for an RF-based LRU. Such a configuration supports data integrity of simulated data, but it may require additional configuration by the simulated tactical LRU, as a simulated tactical LRU does not typically receive live status and target data from an operator system. However, such a configuration also allows the simulated tactical LRU to use the live tactical LRU data with machine learning to update its model and how its model works to match the functionality of a live tactical LRU being mimicked. The simulated tactical LRU could also support artificial inputs and data.

In embodiments where the rule-based message modification module 340 is incapable of merging the live status and target data with the simulated status and target data, the LVC gateway 300 could be configured to transmit the live status and target data to the simulated tactical LRU, which then merges the live tactical LRU data with its own simulated data to generate augmented LRU data, which is a merger of both the simulated data and live data. In embodiments where merging of data is inappropriate, or where the live tactical LRU data are never transmitted to the simulated tactical LRU, the simulated tactical LRU could generate simulated tactical LRU data in accordance with any suitable algorithm without merging the simulated data with live tactical LRU data.

In some embodiments, the simulated tactical LRU device may receive live tactical LRU data and record that data in its own storage, similar to the historical database 342. In such embodiments, the simulated tactical LRU may then transmit pre-recorded live tactical LRU data to the LVC gateway as simulated tactical LRU, which would essentially be a time-delayed message. Such embodiments are useful, for example, to replay through useful live scenarios with pre-recorded tactical LRU data.

Simulated tactical LRU data are typically evaluated by an operator ruleset module 370, which evaluates the received simulated tactical LRU data and determines if that data satisfy predefined rulesets to be passed to the rule-based message modification module 340 for the merged data queue to the operator 350. If the operator ruleset module 370 determines that the data fail the predefined ruleset, then the data can be dropped by a dropped message module 372, which would cause only the live tactical LRU data to be sent to the merged data queue 350.

In some embodiments, the rule-based message modification module 340 could be configured to translate the received simulated tactical LRU data to mimic a preferred format for the operator system. For example, the rule-based message modification module 340 could translate a received simulated tactical LRU dataset to match an ICD of a real, live radar LRU device, or an ICD of a real, live SIGINT/COMINT/ELINT LRU device. In other embodiments, the simulated tactical LRU device will translate the simulated tactical LRU data before transmitting to the LVC gateway in accordance with a command sent to the simulated tactical LRU.

Figure 4:
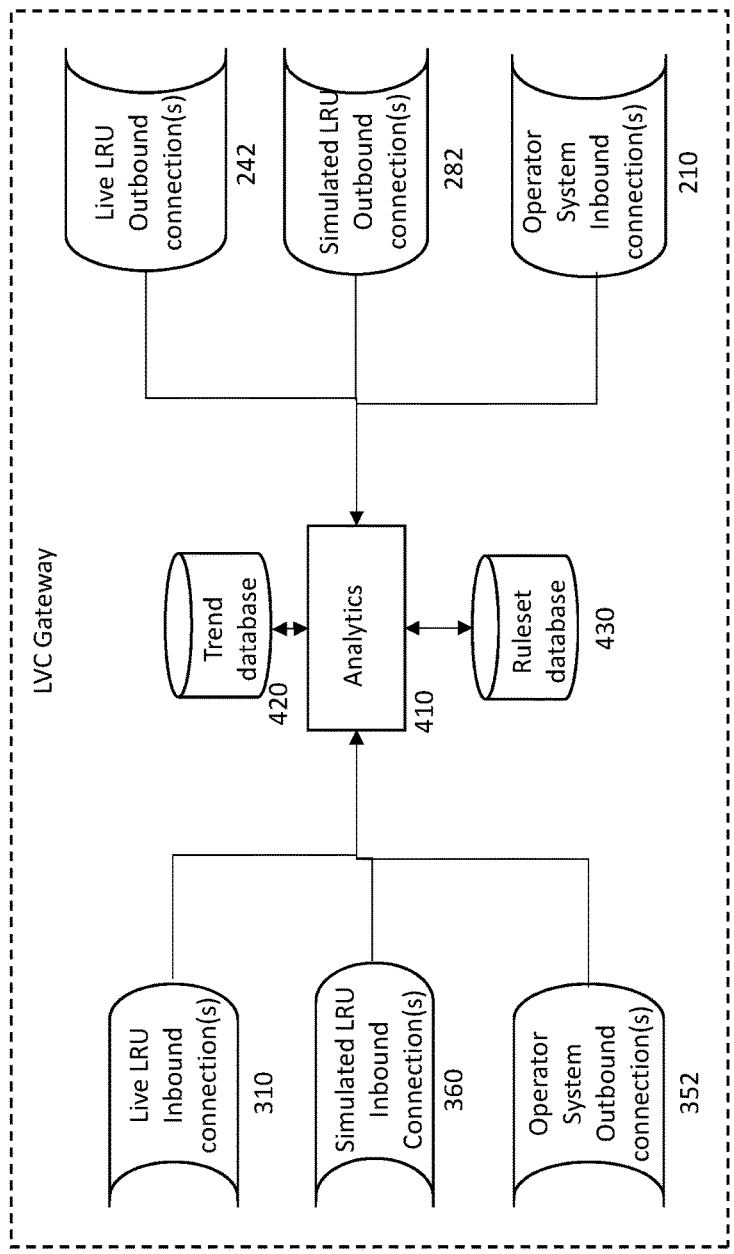
FIG. 4 is a schematic diagram of a logic for performing data analytics to modify rulesets of the LVC gateway, in accordance with aspects of this disclosure.

FIG. 4 diagrammatically represents exemplary LVC Gateway logic for an LVC gateway 300 to transmit both inbound and outbound connection data to an analytics module 410 that is configured to collect, process, and record data that is received by, and transmitted to, connection interfaces. Data from inbound connections from other devices, such as live LRU inbound connections 310, simulated LRU inbound connections 360, and operator system inbound connections 210, as well as outbound connections from other devices, such as operator system outbound connections 352, simulated LRU outbound connections 282, and live LRU outbound connections 242, could be transmitted, in whole or in part, to analytics module 410 for analysis. Analytics module 410 is configured to collect, process, and record data that is transmitted to trend database 420 for use in data analytics algorithms to modify rulesets saved in ruleset database 430, which could be used by ruleset modules, such as ruleset modules 220, 260, 330, and 370, to process LVC Gateway data.

While the rulesets in ruleset database 430 could be defined by admin users, analytics module 410 could also be configured to modify rulesets based upon algorithms that could be selected or defined by admin users. For example, analytics module 410 could be configured to collect response time data from operator system inbound connection 210. Such response time data could be collected and triggered by being configured to monitor data sent by operator system outbound connection 352 for certain kinds of data, such as target data from a radar LRU or a type of message data from a communications LRU, and then calculate the time from when that message is transmitted to operator system outbound connection 352 and a type of response, or any response, is received from operator system inbound connection 210. In some embodiments, triggers could be sent by a simulator system that generates the data, such as a flag. For example, when a simulator system generates data that an operator should respond quickly to, the simulator could transmit a "calculate response time" flag that is then forwarded to analytics module 410 to perform an analysis. Analytics module 410 could be configured to monitor any data and collect metrics in trend database 420. Exemplary metric data includes, for example, a number of correct/incorrect actions (e.g. correct actions are data from operator system inbound connection 210 that match an expected procedure that has been entered into analytics module 410 by an admin user), or subjective proficiency grades by an admin user.

Preferably, the metric data is saved with an identifier of an operator of the operator system being used, for example a unique identifier of the operator (e.g. a personal ID code), or a type identifier of the operator (e.g. a unit ID code, a simulator ID code) that could be used to place the metric in a category for processing. The metric data could be collected in trend database 420 and used by analytics module 410 to modify rulesets for an operator or a group of operators. Such metric data could aggregate and weighted in accordance with any suitable algorithm, for example, to increase or decrease difficulty of a training session. For example, a grade could be calculated by feeding metric data into a grading algorithm (e.g. aggregated response time) which provides a value that could be used to grade a user, and attributed to a that user's personal ID code. The next time analytics module 410 detects the user's personal ID code, analytics module 410 could then adjust a difficulty. A grade above a threshold level could cause analytics module 410 to increase the difficulty, a grade below a threshold level could cause analytics module 410 to decrease the difficulty, and a grade between two threshold levels could cause analytics module 410 to maintain the difficulty level. A difficulty of a simulation could be adjusted by configuring the LVC gateway to transmit a signal to one or more simulated LRU devices to adjust a difficulty of the simulated data that is received, and/or could be adjusted by altering rulesets of ruleset database 430. For example, a grade above a threshold level could trigger analytics module 410 to select rulesets that use more data from live LRUs.

In other embodiments, analytics module 410 could be used for load balancing purposes. For example, analytics module 410 could monitor bandwidth usage with certain live LRU devices, and throttle traffic to those live LRU devices when the bandwidth usage exceeds a predetermined threshold. Traffic could be throttled by selecting rulesets in ruleset database 430 that use more simulated LRU data than live LRU data. For example, one ruleset in ruleset database 430 could use live LRU data, while another ruleset in ruleset database 430 could use simulated LRU data. In an embodiment where 10 operator systems are using the LVC gateway, and 5 operator systems are using the ruleset that uses live LRU data and 5 operator systems are using the ruleset that uses simulated LRU data, analytics module 410 could be configured to monitor traffic to/from a designated live LRU device that is configured to only handle a threshold amount of traffic (defined by an admin user). When the threshold amount is exceeded, analytics module 410 could be configured to adjust a ruleset for an operator system that is using live LRU data to instead use a ruleset to use simulated LRU data. In some embodiments, analytics module 410 could be configured to choose any operator system using a live LRU data ruleset, while in other embodiments, identifiers of the operators could be weighted such that some operators have a higher priority to access live LRU data than other operators.

Figure 5:
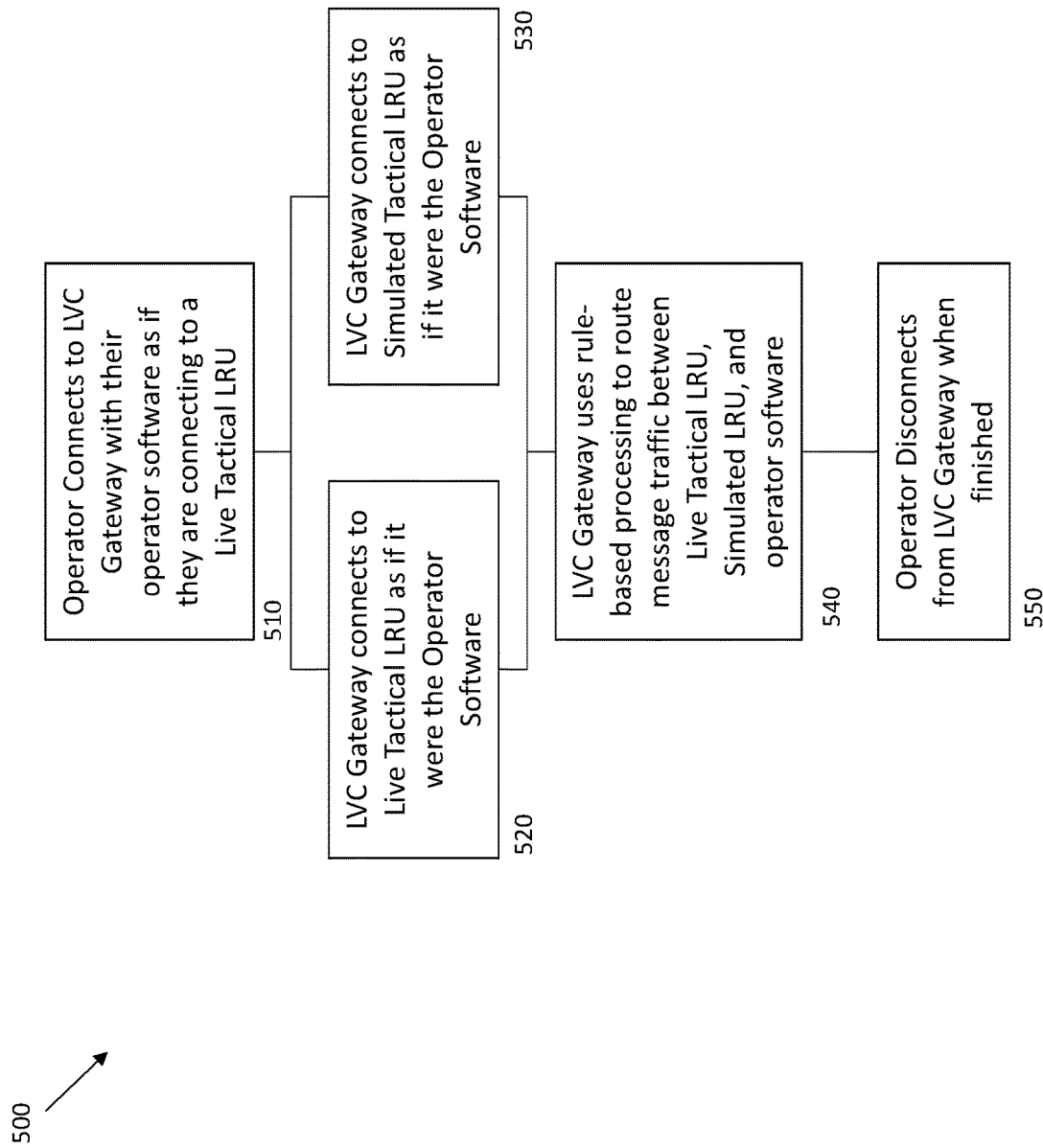
FIG. 5 is a flow-chart of an exemplary method of operating an LVC Gateway, in accordance with aspects of this disclosure.

FIG. 5 depicts an exemplary flowchart 500 of an operator system that connects to an LVC gateway in accordance with this disclosure. Generally, the operator software behaves as though it is functionally connected to a live tactical LRU, while the LVC gateway acts as a "proxy" that routes data traffic accordingly. In step 510, the operator functionally connects to the LVC gateway via the software on the operator system, while in step 520 the LVC gateway routes data traffic to/from the live tactical LRU and in step 530 the LVC gateway routes data traffic to/from the simulated tactical LRU, in accordance with the preconfigured ruleset modules. In step 540 the ruleset modules will handle traffic being sent and received by the LVC gateway to the operator software, the live tactical LRUs, and the simulated tactical LRUs, and may be modified by an analytics module using historical data trends. Once the operator is finished with the training simulation, the operator can disconnect from the LVC gateway in step 550.

An exemplary LVC Gateway training scenario could include an actual aircraft that is equipped with a live tactical LRU radar device and an operator system functionally coupled to one another via a network to a simulated tactical LRU radar device. The goal of the training could be to teach the operator using the operator system how to use the live tactical LRU radar device to find and identify hostile forces in a real-world environment (desert, jungle, mountains). However, the operator system may be located in a place where there are no representative hostile forces to train with. In such an embodiment, a real aircraft may fly and could be functionally coupled to both the live tactical LRU radar device and a simulated tactical LRU radar device. The LVC Gateway could pull live radar data from the RF of the live tactical LRU radar device, including power, steering, etc. The LVC gateway could also be configured to pull simulated radar data from the simulated tactical LRU radar device that transmits radar data of a scenario that is representative of the terrain and the hostile forces that are the training objective. The LVC gateway merges this data into a single signal in accordance with a protocol of the live tactical LRU, such that the LVC gateway transmits live status and target data to the operator system for much of the task, but the effects of the radar and the targets that are identified radar could be data that originates from the simulated tactical LRU. The LVC gateway could combine both of these sources so that the operator and the functional operational software or other tools of the trade will see only a single data stream that appears to be from the live system but is actually augmented to include simulated data.

A feature of systems in accordance with this disclosure is the fact that the LVC gateway merges/combines these streams of data at a very "finite" level into a single stream that is compatible with the operator's/trainee's/user's normal software and systems. The rulesets define how this function is performed, by defining a "source" for each element of a data message, and then the LVC gateway will take parts of data from live tactical LRUs, and parts from simulated tactical LRUs, and combine them at the message field/byte level into a combined, augmented reality representation of the system in the desired operating/training environment.

It will be appreciated from the foregoing that the live virtual constructive gateway systems and methods disclosed herein can be adapted to a wide variety of steerable beam antenna systems, and that antenna systems employing this feature can be operated to provide controlled polarizations in different sequences as will be suitable to different applications and circumstances. It will therefore be readily understood that the specific embodiments and aspects of this disclosure described herein are exemplary only and not limiting, and that a number of variations and modifications will suggest themselves to those skilled in the pertinent arts without departing from the spirit and scope of the disclosure.

What is claimed is:

1. A live virtual constructive (LVC) gateway system, comprising:
   a live line replaceable unit (LRU) transceiver configured to exchange live LRU data with at least one live tactical LRU device;
   a simulated tactical LRU transceiver configured to exchange simulated LRU data with at least one simulated tactical LRU device;
   an operator transceiver configured to exchange operator data with at least one operator device; and
   an LVC gateway having computer software that, when executed by a computer processor, executes instructions to:
      merge the live tactical LRU data and the simulated tactical LRU data in accordance with a merging ruleset to generate merged LRU data; and
      transmit at least a portion of the merged LRU data to the operator device as transmitted operator data;
      wherein the instruction to merge live tactical LRU data and simulated tactical LRU data comprises instructions to:
   analyze the live tactical LRU data to determine a radio-frequency space (RF-space) format;
   convert the simulated tactical LRU data to the determined RF-space format to generate translated simulated tactical LRU data; and
   merge the translated simulated tactical LRU data with the live tactical LRU data to generate a merged RF-space stream.

2. The LVC gateway system of claim 1, wherein the computer software, when executed by the computer processor, further executes instructions to:
   filter commands from received operator data to generate live tactical LRU commands and simulated tactical LRU commands in accordance with a filtering ruleset;
   transmit at least a portion of the live tactical LRU commands to the at least one live tactical LRU device; and
   transmit at least a portion of the simulated tactical LRU commands to the at least one simulated tactical LRU device.

3. The LVC gateway system of claim 1, wherein the instruction to merge live tactical LRU data and simulated tactical LRU data comprises overlaying simulated radar tracks over live radar tracks to generate a merged set of radar tracks.

4. The LVC gateway system of claim 1, wherein the instruction to merge live tactical LRU data and simulated tactical LRU data comprises integrating a simulated audio stream with a live audio stream to generate a merged audio stream.

5. The LVC gateway system of claim 1, wherein the instruction to merge live tactical LRU data and simulated tactical LRU data comprises blending augmented reality data with a live video stream to generate a merged video stream.

6. The LVC gateway system of claim 1, wherein the instruction to merge live tactical LRU data and simulated tactical LRU data comprises blending 3-D models with a live video stream to generate a simulated video target stream.

7. The LVC gateway system of claim 6, wherein the live tactical LRU transceiver receives electro-optical infra-red (EO-IR) turret video output.

8. The LVC gateway system of claim 1, wherein the instruction to merge live tactical LRU data and simulated tactical LRU data comprises blending simulated targets with wide-area motion imagery (WAMI) imagery to generate a training data set.

9. The LVC gateway system of claim 1, wherein the merging ruleset comprises filtering out portions of the live tactical LRU data when specified types of simulated tactical LRU data are received.

10. A method for processing data through an LVC gateway, comprising:
   transmitting and receiving live tactical LRU data;
   transmitting and receiving simulated tactical LRU data;
   transmitting and receiving operator data using an operator device;
   merging the live tactical LRU data and the simulated tactical LRU data in accordance with a merging ruleset to generate merged LRU data; and
   transmitting at least a portion of the merged LRU data to the operator device as transmitted operator data;
   wherein the step of merging live tactical LRU data and simulated tactical LRU data comprises:
      analyzing the live tactical LRU data to determine an RF-space format;
      converting the simulated tactical LRU data to the determined RF-space format to generate translated simulated tactical LRU data; and
      merging the translated simulated tactical LRU data with the live tactical LRU data to generate a merged RF-space stream.

11. The method of claim 10, further comprising:
filtering commands from the received operator data to generate live tactical LRU commands and simulated tactical LRU commands in accordance with a filtering ruleset;
transmitting at least a portion of the live LUR commands to at least one live tactical LRU device; and
transmitting at least a portion of the simulated tactical LRU commands to at least one simulated tactical LRU device.

12. The method of claim 10, wherein the step of merging live tactical LRU data and simulated tactical LRU data comprises overlaying simulated radar tracks over live radar tracks to generate a merged radar track.

13. The method of claim 10, wherein the step of merging live tactical LRU data and simulated tactical LRU data comprises integrating a simulated audio stream with a live audio stream to generate a merged audio stream.

14. The method of claim 10, wherein the step of merging live tactical LRU data and simulated tactical LRU data comprises blending augmented reality data with a live video stream to generate a merged video stream.

15. The method of claim 10, wherein the step of merging live tactical LRU data and simulated tactical LRU data comprises blending 3-D models with a live video stream to generate a simulated video target stream.

16. The method of claim 10, wherein the step of merging live tactical LRU data and simulated tactical LRU data comprises blending simulated targets with WAMI imagery to generate a training data set.

17. The method of claim 10, wherein the merging ruleset filters out portions of the live tactical LRU data when specified types of simulated tactical LRU data are received.

18. A live virtual constructive (LVC) gateway system, comprising:
a live line replaceable unit (LRU) transceiver configured to exchange live LRU data with at least one live tactical LRU device;
a simulated tactical LRU transceiver configured to exchange simulated LRU data with at least one simulated tactical LRU device;
an operator transceiver configured to exchange operator data with at least one operator device; and
an LVC gateway having computer software that, when executed by a computer processor, executes instructions to:
merge the live tactical LRU data and the simulated tactical LRU data in accordance with a merging ruleset to generate merged LRU data; and
transmit at least a portion of the merged LRU data to the operator device as transmitted operator data;
wherein the instruction to merge live tactical LRU data and simulated tactical LRU data comprises blending 3-D models with a live video stream to generate a simulated video target stream; and
wherein the live tactical LRU transceiver receives electro-optical infra-red (EO-IR) turret video output.

19. The LVC gateway system of claim 18, wherein the computer software, when executed by the computer processor, further executes instructions to:
filter commands from received operator data to generate live tactical LRU commands and simulated tactical LRU commands in accordance with a filtering ruleset;
transmit at least a portion of the live tactical LRU commands to the at least one live tactical LRU device; and
transmit at least a portion of the simulated tactical LRU commands to the at least one simulated tactical LRU device.

20. The LVC gateway system of claim 18, wherein the instruction to merge live tactical LRU data and simulated tactical LRU data comprises overlaying simulated radar tracks over live radar tracks to generate a merged set of radar tracks.

21. The LVC gateway system of claim 18, wherein the instruction to merge live tactical LRU data and simulated tactical LRU data comprises integrating a simulated audio stream with a live audio stream to generate a merged audio stream.

22. The LVC gateway system of claim 18, wherein the instruction to merge live tactical LRU data and simulated tactical LRU data comprises instructions to:
analyze the live tactical LRU data to determine a radio-frequency space (RF-space) format;
convert the simulated tactical LRU data to the determined RF-space format to generate translated simulated tactical LRU data; and
merge the translated simulated tactical LRU data with the live tactical LRU data to generate a merged RF-space stream.

23. The LVC gateway system of claim 18, wherein the instruction to merge live tactical LRU data and simulated tactical LRU data comprises blending augmented reality data with a live video stream to generate a merged video stream.

24. The LVC gateway system of claim 18, wherein the instruction to merge live tactical LRU data and simulated tactical LRU data comprises blending 3-D models with a live video stream to generate a simulated video target stream.

25. The LVC gateway system of claim 18, wherein the live tactical LRU transceiver receives electro-optical infra-red (EO-IR) turret video output.

26. The LVC gateway system of claim 18, wherein the instruction to merge live tactical LRU data and simulated tactical LRU data comprises blending simulated targets with wide-area motion imagery (WAMI) imagery to generate a training data set.

27. The LVC gateway system of claim 18, wherein the merging ruleset comprises filtering out portions of the live tactical LRU data when specified types of simulated tactical LRU data are received.

28. A live virtual constructive (LVC) gateway system, comprising:
a live line replaceable unit (LRU) transceiver configured to exchange live LRU data with at least one live tactical LRU device;
a simulated tactical LRU transceiver configured to exchange simulated LRU data with at least one simulated tactical LRU device;
an operator transceiver configured to exchange operator data with at least one operator device; and
an LVC gateway having computer software that, when executed by a computer processor, executes instructions to:
merge the live tactical LRU data and the simulated tactical LRU data in accordance with a merging ruleset to generate merged LRU data; and
transmit at least a portion of the merged LRU data to the operator device as transmitted operator data;
wherein the instruction to merge live tactical LRU data and simulated tactical LRU data comprises instructions to blend simulated targets with wide-area motion imagery (WAMI) imagery to generate a training data set.

29. The LVC gateway system of claim 28, wherein the computer software, when executed by the computer processor, further executes instructions to:
filter commands from received operator data to generate live tactical LRU commands and simulated tactical LRU commands in accordance with a filtering ruleset;
transmit at least a portion of the live tactical LRU commands to the at least one live tactical LRU device; and
transmit at least a portion of the simulated tactical LRU commands to the at least one simulated tactical LRU device.

30. The LVC gateway system of claim 28, wherein the instruction to merge live tactical LRU data and simulated tactical LRU data comprises overlaying simulated radar tracks over live radar tracks to generate a merged set of radar tracks.

31. The LVC gateway system of claim 28, wherein the step of merging live tactical LRU data and simulated tactical LRU data comprises:
analyzing the live tactical LRU data to determine an RF-space format;
converting the simulated tactical LRU data to the determined RF-space format to generate translated simulated tactical LRU data; and
merging the translated simulated tactical LRU data with the live tactical LRU data to generate a merged RF-space stream.

32. The LVC gateway system of claim 28, wherein the instruction to merge live tactical LRU data and simulated tactical LRU data comprises blending augmented reality data with a live video stream to generate a merged video stream.

33. The LVC gateway system of claim 28, wherein the instruction to merge live tactical LRU data and simulated tactical LRU data comprises blending 3-D models with a live video stream to generate a simulated video target stream.

34. The LVC gateway system of claim 33, wherein the live tactical LRU transceiver receives electro-optical infrared (EO-IR) turret video output.

35. The LVC gateway system of claim 28, wherein the merging ruleset comprises filtering out portions of the live tactical LRU data when specified types of simulated tactical LRU data are received.

36. A method for processing data through an LVC gateway, comprising:
transmitting and receiving live tactical LRU data;
transmitting and receiving simulated tactical LRU data;
transmitting and receiving operator data using an operator device;
merging the live tactical LRU data and the simulated tactical LRU data in accordance with a merging ruleset to generate merged LRU data; and
transmitting at least a portion of the merged LRU data to the operator device as transmitted operator data;
wherein the step of merging live tactical LRU data and simulated tactical LRU data comprises blending simulated targets with WAMI imagery to generate a training data set.

37. The method of claim 36, further comprising:
filtering commands from the received operator data to generate live tactical LRU commands and simulated tactical LRU commands in accordance with a filtering ruleset;
transmitting at least a portion of the live LUR commands to at least one live tactical LRU device; and
transmitting at least a portion of the simulated tactical LRU commands to at least one simulated tactical LRU device.

38. The method of claim 36, wherein the step of merging live tactical LRU data and simulated tactical LRU data comprises overlaying simulated radar tracks over live radar tracks to generate a merged radar track.

39. The method of claim 36, wherein the step of merging live tactical LRU data and simulated tactical LRU data comprises integrating a simulated audio stream with a live audio stream to generate a merged audio stream.

40. The method of claim 36, wherein the step of merging live tactical LRU data and simulated tactical LRU data comprises:
analyzing the live tactical LRU data to determine an RF-space format;
converting the simulated tactical LRU data to the determined RF-space format to generate translated simulated tactical LRU data; and
merging the translated simulated tactical LRU data with the live tactical LRU data to generate a merged RF-space stream.

41. The method of claim 36, wherein the step of merging live tactical LRU data and simulated tactical LRU data comprises blending augmented reality data with a live video stream to generate a merged video stream.

42. The method of claim 36, wherein the step of merging live tactical LRU data and simulated tactical LRU data comprises blending 3-D models with a live video stream to generate a simulated video target stream.

43. The method of claim 36, wherein the merging ruleset filters out portions of the live tactical LRU data when specified types of simulated tactical LRU data are received.

44. The LVC gateway system of claim 28, wherein the instruction to merge live tactical LRU data and simulated tactical LRU data comprises integrating a simulated audio stream with a live audio stream to generate a merged audio stream.

* * * * *